May 20, 1947.　　　　P. GEREN　　　　2,420,877
BROACHING MACHINE
Filed Aug. 18, 1944　　　　3 Sheets-Sheet 1
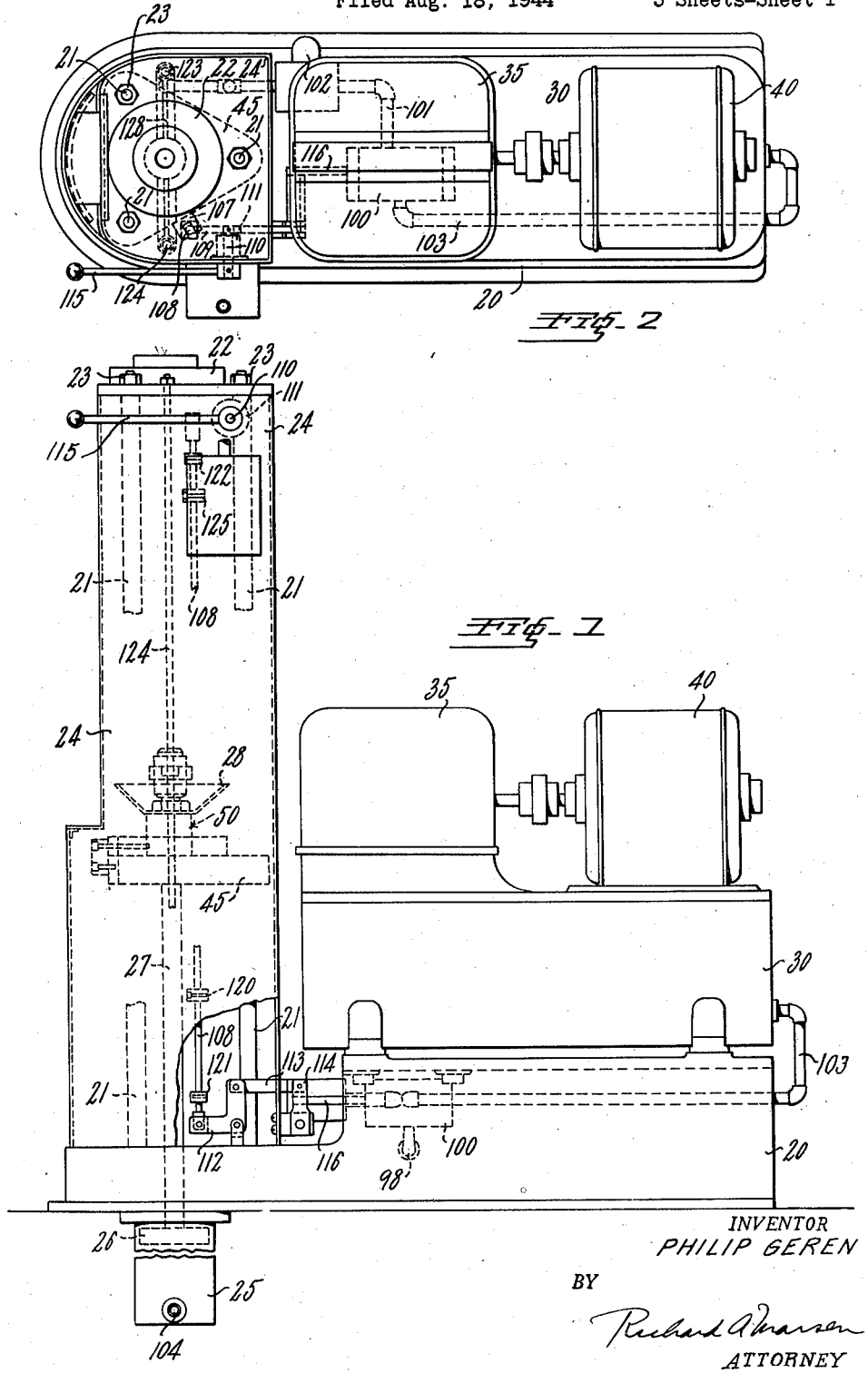
INVENTOR
PHILIP GEREN
BY
Richard A Marsen
ATTORNEY May 20, 1947.  P. GEREN  2,420,877
BROACHING MACHINE
Filed Aug. 18, 1944   3 Sheets-Sheet 2
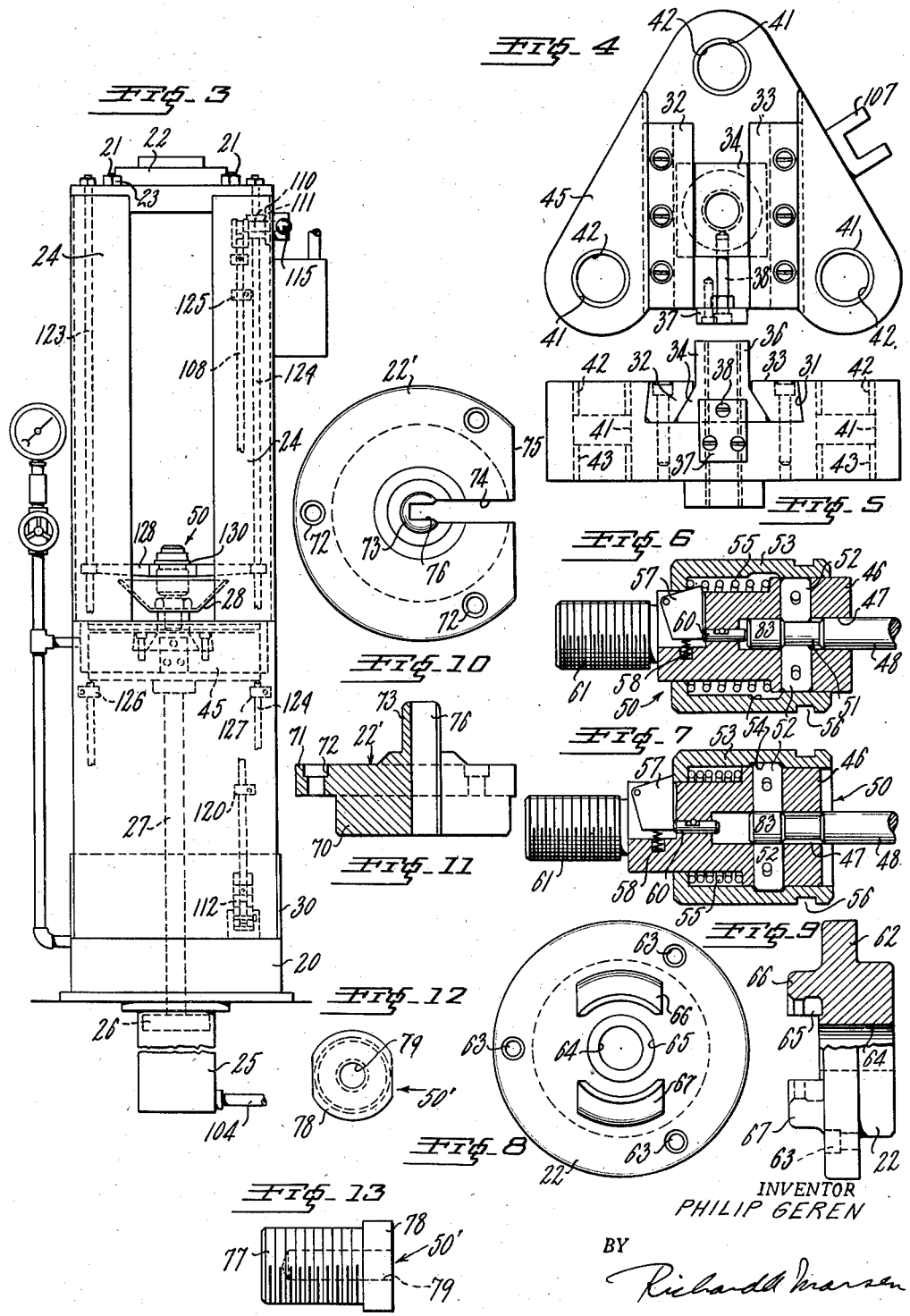
INVENTOR
PHILIP GEREN
BY
Richard Marsen
ATTORNEY May 20, 1947.  P. GEREN  2,420,877
BROACHING MACHINE
Filed Aug. 18, 1944  3 Sheets-Sheet 3
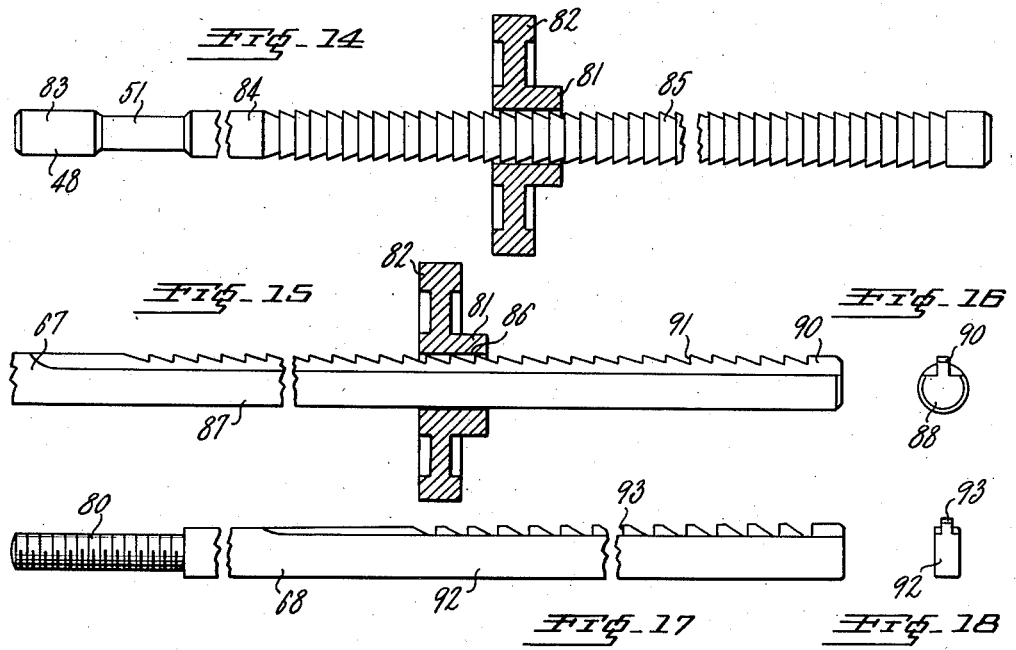
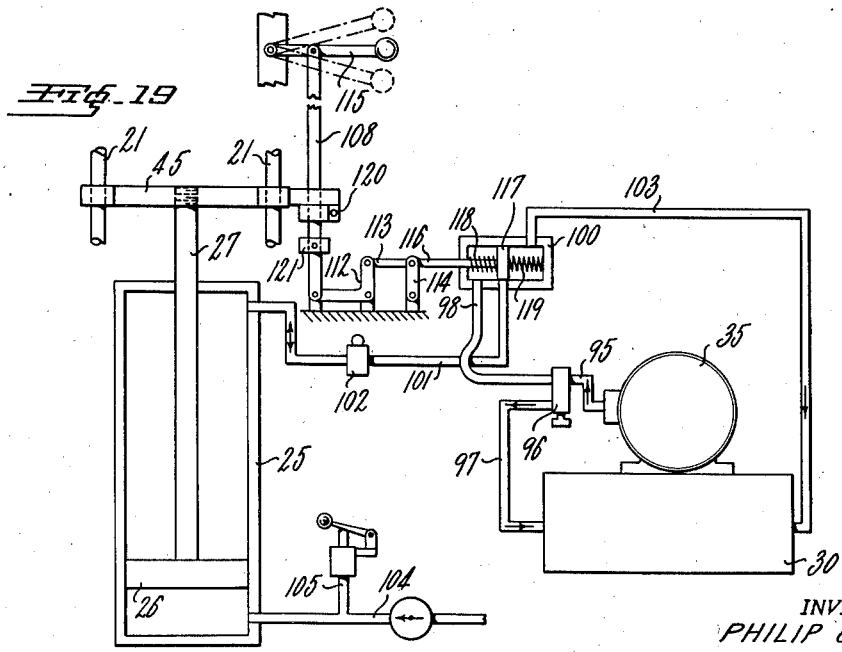
INVENTOR
PHILIP GEREN
BY
Richard A Marsen
ATTORNEY Patented May 20, 1947

2,420,877

UNITED STATES PATENT OFFICE 2,420,877

BROACHING MACHINE

Philip Geren, Grand Rapids, Mich., assignor, by mesne assignments, to Lear, Incorporated, Grand Rapids, Mich., a corporation of Illinois Application August 18, 1944, Serial No. 550,017

3 Claims. (Cl. 90—33)

This invention relates to machine tools and more particularly to an automatically controlled vertical broaching machine.

It is among the objects of this invention to provide a vertical broaching machine including fluid pressure operating means effective on the working stroke and quick-acting means effective on the return stroke; to provide a vertical broaching machine including automatic means for terminating the stroke at preselected points in both directions of movement; to provide a vertical broaching machine including means permanently and automatically limiting the length of the stroke to prevent damage to elements of the machine; to provide a vertical broaching machine including novel quick change work locating adapters; to provide a vertical broaching machine in which a cushion of air is provided beneath an operating piston at all times to prevent damage; to provide a vertical broaching machine including a cross head rigidly aligned with guide means therefor; to provide a vertical broaching machine including automatically operable means for releasing a broach from the cross head at the end of the working stroke; and to provide a vertical broaching machine which is rugged in construction, quick acting, automatically controlled, and includes novel safety features.

These and other objects, advantages and features of the invention will be apparent from the following description and accompanying drawings.

In the drawings:

Fig. 1 is a side elevation view, partly broken away, of a broaching machine embodying the invention.

Fig. 2 is a plan view of the broaching machine.

Fig. 3 is an end elevation view of the broaching machine.

Fig. 4 is a plan view of a cross head forming part of the invention.

Fig. 5 is an end view of the cross head shown in Fig. 4.

Figs. 6 and 7 are cross-sectional views of a novel chuck forming part of the invention.

Fig. 8 is a plan view of one form of work support adapted for use with the invention.

Fig. 9 is an end view, partly in section, of the work support shown in Fig. 8.

Fig. 10 is a plan view of another form of work support for use with the invention.

Fig. 11 is an end view, partly in section, of the work support shown in Fig. 10.

Fig. 12 is an end view of a modified form of chuck for use with the cross head of Fig. 4.

Fig. 13 is a longitudinal view of the chuck shown in Fig. 12.

Fig. 14 is an elevation view, partly in section, of one form of broach which may be used with the invention.

Figs. 15 and 16 are elevation and end views, respectively, a keyway forming broach which may be used with the invention.

Figs. 17 and 18 are elevation and end views, respectively, of a broach, particularly adapted for use with the work support shown in Figs. 10 and 11 and the chuck shown in Figs. 12 and 13.

Fig. 19 is a schematic diagram illustrating the automatic control system of the invention.

Referring to Figs. 1, 2 and 3, the broaching machine comprises a frame 20 to which is secured a vertically disposed hydraulic cylinder 25. A pressure fluid reservoir 30 is mounted on frame 20 and combined therewith is a circulating pump 35 driven by a motor 40 mounted on reservoir 30. Adjacent one end, frame 20 is provided with three vertical guides 21, the lower ends of which are secured in any suitable manner to the frame. A work support 22, which may be either the form shown in Figs. 8 and 9 or that shown in Figs. 10 and 11 is secured by nuts 23 to the upper ends of guides 21. Guides 21 and associated operating parts may, for convenience, be enclosed in a casing or housing 24.

A piston 26 is slidably mounted in cylinder 25 and has secured thereto a piston rod 27, the upper end of which is attached to a cross head or pull head 45 slidably mounted on guides 21. A chuck 50, which may be either the type shown in Figs. 6 and 7 or the type shown in Figs. 12 and 13, is detachably secured to cross head 45 and adapted to be operatively connected with one of the broaches shown in Figs. 14 through 18 to move the same operatively with respect to a work piece mounted on work support 22. A pan or suitable receptacle 28 may be secured to chuck 50 for the purpose of catching any material removed from the work piece, and preventing the same from damaging or interfering with the operation thereof with the parts of the machine.

Cross head 45 is provided with means for accurately centering a chuck attached thereto with respect to a work piece mounted on work support 22. For this purpose, the cross head is formed with a channel 31 in which are adjustably mounted guides 32 and 33. A slide 34, slidably mounted in channel 31, engages guides 32 and 33, and is provided with an internally threaded extension 36 adapted to cooperatively receive the threaded portions of chuck 50, shown in Figs. 8 and 9, or chuck 50' shown in Figs. 12 and 13. A plate 37 is secured to an end of cross head 45 and an adjusting bolt 38 is threadedly mounted in the plate and connected to slide 34. Through bolt 38, slide 34 may be adjusted longitudinally of channel 31 to center the same with respect to the work. Guides 32 and 33 are provided with bevelled surfaces cooperating with similar bevelled surfaces on slide 34, whereby, through suitable vertical adjustment of guides 32 and 33, slide 34 may be adjusted transversely of groove 31 to accurately centering with respect to the work.

Cross head 45 must be rigidly aligned with guides 21 to prevent binding therebetween and insure accuracy of operation. For this purpose, cross head 45, which is generally triangular in form, is provided with apertures 41 at each corner, in which are vertically spaced bearing members 42 and 43 engaging guides 21. The two-point support provided by the spaced bearing members maintains cross head 45 in rigid vertical alignment with guides 21.

The broach releasing chuck 50 shown in Figs. 6 and 7 forms the subject matter of my copending application Serial Number 550,018, filed August 18, 1944, entitled "Chuck," assigned to the same assignee as this case. This chuck comprises an inner member 46 formed with a bore 47 adapted to receive a broach 48. Broach 48 is provided with a chamfered neck portion 51 and is held in bore 47 by retaining plates 52 slidably mounted for radial movement with respect to the bore. A sleeve 53 surrounds member 46 and is provided with a chamfered inner annular recess 54. Normally, a spring 55 maintains sleeve 53 in such a position that elements 52 are urged against neck 51 retaining broach 48 assembled with the chuck. As will be described more fully hereinafter, suitable means are secured in an external channel 56 in sleeve 53, and cooperate with elements of the broaching machine to move the sleeve relative to member 46 from the position shown in Fig. 6 to that shown in Fig. 7.

When the sleeve is moved to such position, a latching plate 57, pivotally mounted in one end of member 46, is urged outwardly by a spring 58 to hold sleeve 53 in the position shown in Fig. 7. A pin 60 is slidably mounted in an aperture forming an extension of bore 47 and engages plate 57. When a broach 48 is inserted in bore 47, it engages pin 60 which causes plate 57 to pivot, releasing sleeve 53. Spring 55 then urges sleeve 53 to the position shown in Fig. 6 where elements 52 are moved inwardly to engage neck 51. The chuck is formed with a threaded extension 61 which is adapted to be secured in the extension 36 of slide 34 forming part of cross head 45.

The broaches used with chuck 50 are particularly designed to cooperate with the work support 22 shown in Figs. 8 and 9. Work support 22 comprises a cylindrical member formed with an annular flange 62 provided with shouldered apertures 63 by means of which it is supported on the upper ends of guides 21. Work support 22 is formed with an axial bore 64 adapted to receive and guide a broach 48 with respect to a workpiece mounted on the support. Adjacent its upper end, bore 64 is enlarged as at 65 to receive the hub of a gear or other member to be broached. Surrounding the enlarged portion of the bore 64 are spaced arcuate support members 66 and 67 upon which the work rests during the broaching operation. Work support 22 is particularly adapted for use with either the broach 48 shown in Fig. 14 or the broach 67 shown in Figs. 15 and 16.

Another form of work support 22', which is particularly adapted for use with the broach 68 shown in Figs. 17 and 18 and the chuck 50' shown in Figs. 12 and 13, comprises a cylindrical member 70 formed with an annular flange 71 having shouldered apertures 72 by means of which the work support is supported on guides 21. Support 22' is formed with a downwardly extending extension 73, and a radial slot 74 extends from a flattened portion 75 of its periphery to a point beyond its center. Slot 74 intersects an axial slot 76 extending through the member 70 and the extension 73. As will be described more fully hereinafter, when using work support 22', chuck 50' and broach 68, it is not necessary to remove the broach from the chuck between successive operations. The chuck 50' which cooperates with work support 22' and broach 68 comprises a threaded cylindrical member 77 having a head 78 and a threaded bore 79 which is adapted to receive the threaded end 80 of broach 68.

Broaches adapted to cooperate with chuck 50 and work support 22 are shown in Figs. 14, 15 and 16. Broach 48 shown in Fig. 14 is adapted to shape the interior or bearing surface of a hub such as 81 on a gear 82. Broach 48 comprises a head 83, a chamfered neck portion 51, and a shank 84 provided with cutting elements 85 progressively increasing in diameter from one end of the shank to the other. The neck 51 cooperates with the retaining members 52 of chuck 50 to retain the broach assembled thereto.

Broach 67 shown in Figs. 15 and 16 is adapted to broach a keyway 86 in a hub such as 81 of gear 82. The left end of this broach, which has been omitted from the drawing for the sake of simplicity, is identical with that of broach 48, being formed for cooperation with chuck 50. The shank 87 comprises a generally cylindrical portion 88 adapted to have guiding engagement with bore 64 in work support 22, and a rectangular key-way cutting portion 90 formed with teeth 91 which progressively increase in height, but not in width, from one end of the chuck to the other.

Broach 68 shown in Figs. 17 and 18 includes the threaded attaching portion 80 adapted to be secured in threaded bore 79 of chuck 50' shown in Figs. 12 and 13. Shank 92 of this broach is generally rectangular in form for cooperation with the slot 74 of work support 22'. The shank is also formed with cutting teeth 93 which progressively increase in size from one end of the broach to the other. Due to the fact that the radial depth of shank 92 is less than the internal hub diameter of the gear to be broached, and the shank 92 has guiding engagement with the inner end of slot 74, it is not necessary to remove broach 68 from chuck 50' between successive broaching operations. When a gear has been broached and the broach is at the lower end of its stroke, the completed gear is removed. The broach is then returned to its upper position and another gear is slipped over the broach and placed on the support 22'. The broaching operation is then repeated.

The operation of the broaching machine will now be described. Referring to Figs. 1, 2, 3 and 19, motor 40 continually drives pump 35 to force pressure fluid from reservoir 30 out through conduit 95, which is connected to a suitable form of pressure unloading valve 96. A return conduit 97 connects valve 96 to reservoir 30. Another conduit 98 connects valve 96 to one end of a four-way control valve 100. Conduit 101 connects valve 100 to cylinder 25 above piston 26 through a suitable speed control valve 102. A conduit 103 connects the other end of valve 100 to reservoir 30.

Air under a constant pressure is supplied to the underside of piston 26 through a conduit 104, to which is connected a pressure regulating valve 105. The arrangement is such that air under pressure is constantly maintained beneath the piston 26. This air under pressure affords a continuous cushion to downward movement of piston 26 and the associated elements of the broaching machine, thereby preventing any possible damage thereto. Additionally, and as will be described more fully, when the hydraulic pressure above piston 26 is released, the air beneath the piston rapidly moves the piston and associated parts to an upward position for the start of a new broaching operation.

Referring to Figs. 1 and 4, cross head 45 is provided with a forked extension 107, which is in slidable engagement with a rod 108 pivotally connected at its upper end to an arm 109 which terminates at and is mounted on shaft 110 mounted in a bearing 111. On the outer end of shaft 110 is a control handle 115. The lower end of rod 108 is connected to one arm of a crank 112 connected by a link 113 to a pivotally mounted link 114 provided with a recess receiving a rod 116 which is secured to a piston 117 in valve 100. Springs 118 and 119 normally tend to maintain piston 117 in a position closing a port connected to conduit 101. When handle 115 is moved from the full line position shown in Fig. 19 to the upper dotted line position, piston 117 is moved to the right, establishing communication between conduits 98 and 101. Hydraulic fluid under pressure is thereby admitted to cylinder 25 above piston 26 forcing the latter and connected cross head 45 downwardly. During this operation, the broach is pulled downwardly through a work piece mounted on the work support 22 or 22' effecting a broaching operation thereon.

Automatic means are provided for limiting the length of the broaching stroke in both directions. These means comprise stops 120 and 125 adjustably mounted on rod 108. By suitable adjustment of stops 120 and 125 along rod 108, the range of movement of cross head 45 may be predetermined. When handle 115 is moved to the upper position, whereby cross head 45 and piston 26 are moved downwardly due to the application of pressure fluid to cylinder 25, extension 107 will engage stop 120 at a predetermined point in its downward movement, moving rod 108 downwardly and handle 115 to the neutral position. This positions piston 117 in the position shown in Fig. 19 in which it closes the port leading to conduit 101 maintaining the pressure fluid trapped in cylinder 25 above piston 26.

To effect a return movement of cross head 45, handle 115 is moved to the lower dotted line position shown in Fig. 19, moving piston 117 to the left and establishing communication between conduits 101 and 103. The compressed air under piston 26 thereupon rapidly moves the piston to its upper position forcing the pressure fluid to flow outwardly from cylinder 25 through valve 102, conduit 101, valve 100 and conduit 103 into reservoir 30. At a predetermined point in the upward movement of cross head 45, member 107 engages stop 125 to move rod 108 upwardly, thus returning handle 115 to the neutral position and again trapping pressure fluid in the cylinder above the piston.

A feature of the invention is the provision of safety means for permanently limiting the length of the stroke of cross head 45, within the range of movement of piston 26 in cylinder 25. This means comprises stops 121 and 122 fixedly secured to rod 108 beyond the adjustable stops 120 and 125 respectively. Stops 121 and 122 thus limit the range of movement of adjustable stops 120 and 125 to a safe value.

When chuck 50 is used with cross head 45, automatic means are provided for disconnecting broach 48 from the chuck at a point before cross head 45 has reached its lower limit of movement. Thus, broach 48 may be removed from the machine before the beginning of the upward stroke of the cross head. This means comprises a pair of rods 123 and 124 fixedly secured to the upper and lower ends of the frame. Stops 126 and 127 are adjustably mounted on rods 123 and 124 respectively, and are arranged to engage a cross arm 128 which is set in the external groove 56 of sleeve 53 of chuck 50, and held therein by suitable locking member 130.

When cross head 45 starts its downward movement, the elements of chuck 50 are in the relation shown in Fig. 6. During continued movement of cross head 45, arm 128 engages stops 126 and 127. This stops further movement of sleeve 53 downwardly, while member 46 of the chuck still continues its downward movement as it is rigidly connected to cross head 45. Thus sleeve 53 is moved to the right with respect to member 46 to the position shown in Fig. 7, and is latched in such position by latch plate 57. Broach 48 then may be pulled from the chuck, its head 83 forcing retaining members 52 outwardly into annular recess 54 thus releasing the broach. Stops 126 and 127 must be so set with relation to stop 120 that the downward movement of cross head 45 will be stopped immediately after disengagement of broach 48.

When cross head 45 and chuck 50 have been returned to an upward position, a new broach is easily inserted in chuck 50 by pushing the same into bore 47 until it engages pin 60 swinging latch plate 57 clockwise to release sleeve 53 and permit it to move to the position shown in Fig. 6. In this position, sleeve 53 forces plates 52 inwardly to engage neck 51 of the broach, retaining the same securely connected to chuck 50.

The described broaching machine permits rapid, sequential, broaching operations, due to the provision of the quick return mechanism and the automatic means for limiting the stroke of cross head 45. Additionally, the novel work supporting members and broaches associated therewith, facilitate successive operations on similar work pieces. The air cushion provided beneath piston 26 at all times, prevents damage to the apparatus due to piston 26 striking the bottom of cylinder 25. The value of this feature is enhanced by the provision of the fixed stops 121 and 122 which limit the range of adjustment of the adjustable stops 120 and 125 in a manner to prevent any damage to the parts of the machine.

While a specific embodiment of the invention has been described to illustrate the application of the principles thereof, it will be understood that the invention may be otherwise embodied without departing from such principles.

What is claimed is:

1. A vertical broaching machine comprising, in combination, a frame; vertical guideways mounted on said frame; a work support mounted on said guideways; a cross head slidably mounted on said guideways; means for attaching a broach to said cross head for operative movement relative to a work piece mounted on said work support; a cylinder; a piston slidably mounted in said cylinder for vertical movement with respect to said frame; a piston rod connecting said piston and said cross head; means for supplying a fluid under pressure to said cylinder above said piston; means for maintaining air under pressure in said cylinder beneath said piston; means for regulating cylinder air pressure; manually operable means for initiating the supply of said fluid to said cylinder; means operable by said cross head at a predetermined point in its downward movement for terminating the supply of said fluid to said cylinder to arrest downward movement of said cross head; manually operable means for effecting discharge of said fluid from said cylinder to effect rapid upward movement of said piston and said cross head and said chuck under the influence of said air under pressure; and means operable by said cross head at a predetermined point in its upward movement for terminating the discharge of said fluid from said cylinder to arrest upward movement of said cross head.

2. A vertical broaching machine comprising, in combination, a frame; vertical guideways mounted on said frame; a work support mounted on said guideways; a cross head slidably mounted on said guideways; means for attaching a broach to said cross head for operative movement relative to a work piece mounted on said work support; a cylinder; a piston slidably mounted in said cylinder for vertical movement with respect to said frame; a piston rod connecting said piston and said cross head; a source of fluid under pressure connected to said cylinder above said piston; means for maintaining air under pressure in said cylinder beneath said piston; a valve controlling the flow of said fluid to and from said cylinder; a pivotally mounted operating arm controlling said valve; a vertically disposed rod pivotally connected at one end to said arm; an operating handle pivotally connected to the other end of said rod and to said frame; said handle being operable to an upward position to condition said valve to admit said fluid to said cylinder to force said cross head downwardly to pull the broach through such work piece and to a downward position to condition said valve to discharge said fluid from said cylinder to effect rapid upward movement of said piston and said cross head under the influence of said air under pressure; an abutment on said cross head slidably engaging said rod; and a pair of stops adjustably secured to said rod on either side of said abutment, one of said adjustable stops being engageable by said abutment during downward movement of said cross head to move said handle to an intermediate valve closing position to arrest downward movement of said piston and said cross head and the other of said adjustable stops being engageable by said abutment during upward movement of said cross head to move said handle to said intermediate valve closing position to arrest upward movement of said piston and said cross head.

3. A vertical broaching machine comprising, in combination, a frame; vertical guideways mounted on said frame; a work support detachably mounted on the upper portion of said guideways; a cross head slidably mounted on said guideways below said work support; means for attaching a broach to said cross head for operative movement relative to a work piece mounted on said work support; a cylinder; a piston slidably mounted in said cylinder for vertical movement with respect to said frame; a piston rod connecting said piston and said cross head; a source of fluid under pressure connected to said cylinder above said piston; means for maintaining air under pressure in said cylinder beneath said piston; a valve controlling the flow of said fluid to and from said cylinder; a pivotally mounted operating arm controlling said valve; a vertically disposed rod pivotally connected at one end to said arm; an operating handle pivotally connected to the other end of said rod and to said frame; said handle being operable to an upward position to condition said valve to admit said fluid to said cylinder to force said cross head downwardly to pull the broach through such work piece and to a downward position to condition said valve to discharge said fluid from said cylinder to effect rapid upward movement of said piston and said cross head under the influence of said air under pressure; an abutment on said cross head slidably engaging said rod; a pair of stops adjustably secured to said rod on either side of said abutment, one of said adjustable stops being engageable by said abutment during downward movement of said cross head to move said handle to an intermediate valve closing position to arrest downward movement of said piston and said cross head and the other of said adjustable stops being engageable by said abutment during upward movement of said cross head to move said handle to said intermediate valve closing position to arrest upward movement of said piston and said cross head; and a pair of stops each fixedly secured to said rod outwardly of said adjustable stops for limiting the range of adjustment of the latter.

PHILIP GEREN.

REFERENCES CITED

The following references are of record in the file of this patent:

UNITED STATES PATENTS

| Number | Name | Date |
|---|---|---|
| 2,135,861 | Thompson | Nov. 8, 1938 |
| 2,225,731 | Averill | Dec. 24, 1940 |
| 2,106,213 | Halborg | Jan. 25, 1938 |
| 1,875,033 | Lapointe | Aug. 30, 1932 |
| 1,532,107 | Ferris | Mar. 31, 1925 |
| 1,929,593 | La Pointe | Oct. 20, 1933 |
| 2,162,813 | Hart | June 20, 1939 |
| 2,016,654 | Shippy et al. | Oct. 8, 1934 |
| 1,937,121 | Lapointe | Nov. 28, 1933 |
| 2,135,157 | West | Nov. 1, 1938 |

FOREIGN PATENTS

| Number | Country | Date |
|---|---|---|
| 151,364 | Great Britain | Sept. 23, 1920 |
| 450,873 | Great Britain | July 27, 1936 |
| 445,309 | Great Britain | Apr. 7, 1936 |
| 440,852 | Great Britain | Jan. 7, 1931 |